United States Patent
Powollik et al.

(10) Patent No.: US 6,227,375 B1
(45) Date of Patent: May 8, 2001

(54) DEVICE FOR MONITORING THE TRANSPORT PROCESS OF FLAT DESPATCHES

(75) Inventors: Dieter Powollik; Frank Voss, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/180,421

(22) PCT Filed: Apr. 24, 1997

(86) PCT No.: PCT/EP97/02084

§ 371 Date: Feb. 19, 1999

§ 102(e) Date: Feb. 19, 1999

(87) PCT Pub. No.: WO97/43055

PCT Pub. Date: Nov. 20, 1997

(30) Foreign Application Priority Data

May 13, 1996 (DE) .............................................. 196 19 068

(51) Int. Cl.$^7$ .................................................. G01N 19/00
(52) U.S. Cl. .......................... 209/509; 73/865.9; 73/865.8
(58) Field of Search ................................. 73/865.9, 865.8; 209/509

(56) References Cited

U.S. PATENT DOCUMENTS

| | | |
|---|---|---|
| 3,438,489 | 4/1969 | Cambornac et al. . |
| 3,750,167 | 7/1973 | Gehman et al. . |
| 4,058,217 | 11/1977 | Vaughan et al. . |

FOREIGN PATENT DOCUMENTS

| | | |
|---|---|---|
| 4217266C1 | 7/1993 | (DE) . |
| 4238102C1 | 11/1993 | (DE) . |
| 0743615A1 | 11/1996 | (EP) . |

*Primary Examiner*—Donald P. Walsh
*Assistant Examiner*—Jonathan R. Miller
(74) *Attorney, Agent, or Firm*—Venable; Norman N. Kunitz

(57) ABSTRACT

The invention relates to a device for monitoring the transport process of flat despatches with a sensor, a store and an evaluation device, in which the device, takes the form of a flat despatch having a number of different regions, especially rigid and flexible regions. According to the invention, the regions are formed in such a way that the device has comparable machine compatibility and solidity to ordinary despatches. The regions consist of component, stamping and franking (1), belt-running (2, 3), buffer and intake (4) and bend and fold regions (6).

7 Claims, 3 Drawing Sheets

DEVICE FOR MONITORING THE TRANSPORT PROCESS OF FLAT DESPATCHES

BACKGROUND OF THE INVENTION

The present invention relates to the field of analysis and quality control of transporting processes, in which consignments are handled and transported and in which parts of the handling operation, in particular sorting processes, are carried out mechanically.

A predominant field of use of the invention is the analysis and quality control of letter conveying and handling processes by means of objective measurement data obtained directly in the process.

The invention relates, in the narrower sense, to so-called electronic letters, that is to say consignments with electronic components and with conventional letter formats capable of being handled mechanically. Such apparatuses are capable of recording the physical quantities, such as, for example, acceleration, temperature, electric and magnetic fields, which act on them in their vicinity, of converting said quantities into electronic signals, and of processing these signals and storing them as data and do not require any modifications of or additions to the technical equipment involved in the transport process and also do not influence the latter.

The evaluation of the data recorded from electronic letters makes it possible to analyze the time profile of the transport of the electronic letter in the letter conveying and handling process. Consequently, precise conclusions as to whether regulations, rules and operating parameters are being adhered to in the various steps of the letter conveying and handling process can be drawn and weak points found and analyzed, and, therefore, if there are sufficiently large random samples, accurate data on the letter conveying and handling process can be obtained. Letter handling machines are designed and set in such a way that they handle an enormous number of letters with a high output and with a high degree of reliability and effectiveness. The letters capable of being handled in this way are designated, here, as normal letters. They are defined by the following features:

- The length and width dimensions correspond to those of standardized letter formats or letter formats permitted by the national Mail Administrations or private mail services.
- The thickness of the normal letter is often in the range up to 2 mm. Letters with a thickness of 5 to 6 mm are permitted for mechanical handling.
- The thickness profile is constant over the entire normal letter and decreases only in the edge regions.
- The mass of the normal letter is usually lower than 20 g. However, because of the formats and letter thickness which can be used, masses of 50 to 60 g are possible and are permitted for machine handling.
- The density of the normal letter is uniform over the area.
- The resilience of the letter surface is low since the letter usually contains paper.
- Flexibility/pliability is uniform, anisotropic and high.
- The area center of gravity and mass center of gravity of normal letters are identical.
- Normal letters do not undergo plastic deformation during mechanical handling.
- Depending on the machine design, it is unimportant, for the normal letter, whether it is conveyed in a main or a secondary conveying direction.

In this case, the main conveying direction runs along the long edges of the letter format and the secondary conveying direction runs along its short edges.

Codes applied by letter handling machines by means of different printing methods (for example, ink jet, thermal transfer) for the coding of routes are machine-readable.

In the preceding manual handling steps (preculling), normal letters are not sorted out by the personnel operating the apparatus on the basis of the visual and tactile impression which they give.

An essential criterion for the technical evaluation of letters is machine compatability. Normal letters are machine-compatible.

In addition to normal letters, letters are permitted for machine handling which, in one or more instances, reach limiting ranges regarding their physical properties (for example, letter thickness, rigidity/pliability, mass center of gravity, mass), so that they are machine-compatible to only a qualified extent, that is to say their machine compatibility is impaired. The result of this is that they are taken out more often than normal letters or part functions of the machines are disrupted or not properly executed more often or lead to greater wear of particular parts of the machine. Moreover, the machine compatibility of such letters depends particularly on the setting and the state of maintenance of the machines.

This qualified machine compatibility is present, in particular, when letters in widespread letter handling machines, more often than normal letters,

- are separated out in format separating and setting-up machines on account of too great a thickness and/or rigidity
- lead to jams in the letter run or at deflectors or at singling-out devices or leave the conveying stage in an uncontrolled manner
- lead to faults during stacking in stackers or compartments
- have stamp imprints of impaired readability
- have code imprints of impaired machine-readability
- necessitate manual corrections of the stack in intermediate stackers
- lead to increased wear of or damage to parts of the machines.

Furthermore, there are letters and other consignments which are always separated out manually before or mechanically at the start of handling (for example, in the format separating and setting-up region) on account of their physical properties, for example dimensions, letter thickness, thickness profile, rigidity/pliability, mass center of gravity, mass.

A further essential criterion for the technical evaluation of letters, which applies particularly to electronic letters which are machine-compatible, is machine resistance. This states to what extent and how often letters are damaged or destroyed during handling by the machine. In the case of normal letters, it is very rare that they are, for example, torn, ripped up or crumpled.

As regards electronic letters, it is obvious, by virtue of their makeup, that, if they do not have a stress-compliant design, it is possible more often that their functioning will be disrupted, they will be damaged, their service life may be reduced or they may be destroyed.

The following have a particularly adverse effect on the machine resistance of electronic letters:

- belt pulling forces, jolt, shock and impact forces in the letter run in the main conveying direction belt pulling forces, jolt, shock and impact forces in the letter run in the secondary conveying direction bending forces at deflecting rollers and deflectors accelerations during drawing off and singling out braking accelerations during stacking in compartments, stackers or intermediate stackers compressive forces during stamping.

So that the abovedescribed use of electronic letters is not subjected to any restrictions, they must be capable, without exception, of running through all the part-processes, without being separated out from individual process steps, without their functioning being disrupted or without them even being destroyed. Separating out in individual process steps would lead to a kind of further handling which is no longer representative of the process to be investigated. The reliability of data recorded in this way and of the quality characteristics derived from them would be restricted and, consequently, their value for assessing the quality of the letter conveying and handling process would be diminished.

DE-A 42 38 102 has already disclosed an apparatus for determining running times of letters, in which approximately ¾ of the entire area of the electronic letter consists of two rigid printed card parts which are arranged in such a way that the circuit and the power supply are exposed, relatively unprotected, to all the mechanical effects of machine handling and may easily be destroyed. The flexible parts extend over the entire width of the printed card parts. Due to the high mechanical demands during mechanical handling and stamping and because it does not have the necessary machine compatibility, in the same way as normal letters, this apparatus does not possess any processing reliability over a relatively long period of time.

The object of the invention is to provide an apparatus which behaves in the same way as a normal paper letter in all the process steps of letter conveyance and handling and which can be handled by all conventional letter handling machines and thus makes it possible to ensure that the data obtained in the letter conveying and handling process are reliable and to increase functional reliability and service life.

SUMMARY OF THE INVENTION

The above object generally is achieved according to the invention by an apparatus for monitoring the process of transporting flat consignments, with apparatus being designed as a flat consignment, and having a sensor device, a memory device, an evaluation device and a power supply that are located in one or more component zones designed as rigid regions, and in which apparatus: there are between the component zones flexible bending and folding zones that have flexible padding material and flexible electric connecting elements for the components and that are in the main transport direction, in each case, at least half as long as the length of the largest adjoining component zone; there is a padded stamp zone having a compressive strength adapted to the stamping pressures, with the stamp zone being capable of overlapping with other zones, in addition to the component zones; there is a buffer and entry zone that consists of flexible padding material and that extends from the circumferential edges of the apparatus as far as the component zones and the bending and folding zones, with the thickness of the buffer and entry zones at the boundaries with the component zone and bending and folding zone being approximately equal to the thickness of these zones and the decreasing toward the circumferential edges; and the position of the component zones and the distribution of the masses over the component zones are such that the positions of the mass center of gravity and of the area center of gravity of the apparatus in relation to half the length and half the width of the apparatus differ from one another by no more than 6%. Advantageous embodiments of the invention are specified in the subclaims.

The advantages of the apparatus according to the invention are to be seen, in particular, in its use under the extreme mechanical loads occurring during the machine handling of letters.

The apparatus is suitable for handling by conventional machines in the same way as a normal letter and can also be integrated into other formats by means of slight modifications. The machine resistance is such that the service life amounts, on average, to 2 years or can be exposed to 1000 runs through various conventionally used machines, without any operating faults.

The invention is based on the knowledge that it is not necessary to reproduce all the properties of normal letters completely on electronic letters, in order to achieve machine compatibility and machine resistance which are comparable to those of normal letters, but that it is sufficient, instead, to adhere to these properties only in definite surface regions (designated below as zones).

The invention is described in more detail below with reference to the drawings:

DETAILED DESCRIPTION OF THE DRAWINGS

The apparatus according to the invention has at least one sensor device, one memory device and one evaluation device.

Figure 1:
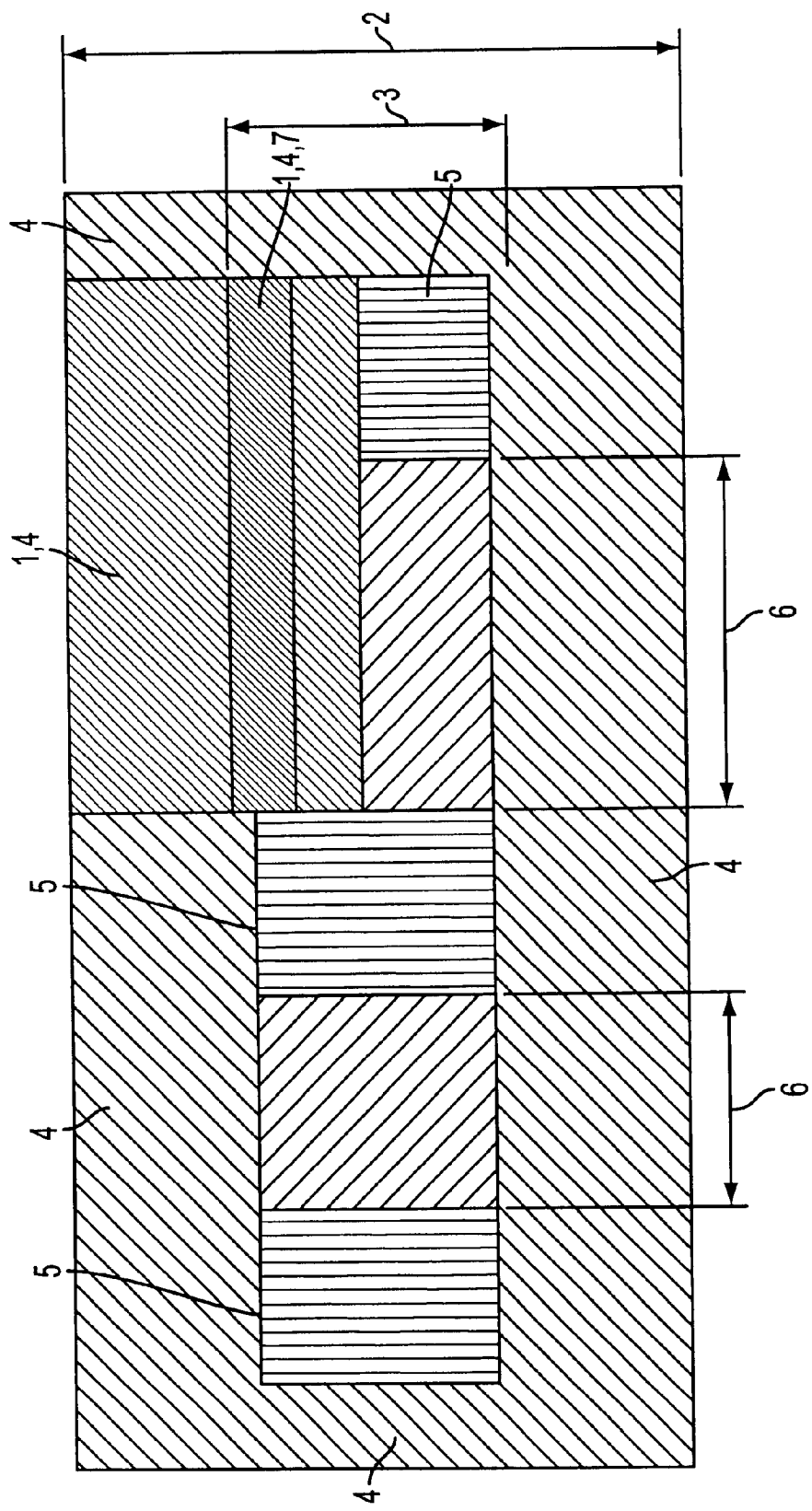
FIG. 1 shows the zone division for an apparatus according to the invention in a schematic longitudinal sectional view.

The stamp zone 1 in FIG. 1 should not be overlapped by a component zone, since the hard edges of the component zone may damage the stamping mechanisms. The stamp zone must be large enough to ensure that all conventional stamps, including the advertising block, can be applied there.

The stamp zone is 1 composed of a suitable flexible padding material of closed-cell foam with a density of 45 kg/m$^3$ and a crushing resistance according to DIN 53577 at 40% compression of between 65 and 95 kPa with a predominantly constant thickness. This material is selected specially for these requirements in view of its compressive strength. The stamp zone may also, in parts, be of steplike or wedgelike design, particularly when it is necessary to have an overlap with a buffer and entry zone. The stamp imprint applied to the envelope by means of all "commercially available" stamping devices must be easily readable, that is to say the padding material should not be too soft. The padding material must tolerate at least 1000 stampings, with a typical force of up to 300 N applied to a rolling stamp with a diameter of 28 mm, without appreciably and permanently changing its process-relevant properties, that is to say crushing resistance, flexibility, uniformity or its thickness.

In conventional letter handling machines, particularly in high-performance machines employed by national Mail Administrations or mail services, belts or bands with a width of 20 to 140 mm are typically used in the so-called letter run, in which the letter is conveyed, for example, by the action of transport belts, transport bands and/or rollers. In this case, belt forces act, via different looping angles (typically 1 to 30 degrees) at the deflecting rollers on the transported letters and therefore also on the electronic letter. Both rigid belts or bands, sometimes with a separate pulling layer, and elastic belts or bands having different widths are employed. The electronic letter likewise experiences bending, folding, vibrational, impact and jolting stresses in the letter run.

If the belt width used is so large that the entire electronic letter is encompassed by the belt, that is to say the belt running zone (2) in FIG. 1 covers all the other zones, then it is sufficient if the thickness profile is designed in such a way that it descends toward the letter edges, as may also be gathered from the properties of the buffer and edge zone.

However, letter handling machines which convey the consignments in the letter run between 35 mm wide belts in the main transport direction are in the most widespread use throughout the world at national Mail Administrations and at mail services. In this case, typical letter formats, for example, the DIN formats C6 and DL or the American format #10, are transported approximately centrally between the belts. The DIN format DL is also the format of the exemplary embodiments of the electronic letter. The forces acting on the electronic letter in the letter run are transmitted to it by these predominantly 35 mm wide belts. This region of the letter is therefore also designated as the main belt running zone 3.

In order to protect the elements in the component zones by distributing the acting forces uniformly over the entire belt running zone, it is therefore necessary to keep the thickness profile in this region completely or predominantly constant. Exceptions to this are overlaps with buffer and entry zones.

A buffer and entry zone 4 in FIG. 1 extends from one edge of the electronic letter as far as a parallel edge of a rectangle circumscribing a component zone. Said buffer and entry zone 4 is manufactured from flexible padding material which has appropriate crushing resistance, so that, particularly during machine stacking, no effects untypical of letters, such as, for example, rebound from compartment or stack walls, occur. Furthermore, the buffer and entry zones 4 provided with a wedgelike or steplike thickness profile prevent impairments, in particular when letters are being singled out or else during separating out in terms of thickness and rigidity, since, here too, a "smoother" entry, that is to say an entry more akin to that of a paper letter, is ensured.

The thickness of the buffer and entry zone 4 is equal to that of the component zone at the boundary with the latter.

If the increase in the thickness profile, ideally assumed to be a wedge, is, on average, lower than or equal to 1:3, this ensures that no impairments occur.

This means that, in the case of a predominantly constant thickness profile of the component zone 5 of 4 mm, the buffer and entry zone 4 must be at least 12 mm wide. A minority of the letter handling machines employed throughout the world at the present time convey consignments in a secondary conveying direction. Furthermore, particularly in format separating machines, consignments are sometimes transported undesirably in the secondary conveying direction on account of the stochastic process of setting up the letters. For these reasons, the electronic letter has buffer and entry zones 4 not only on the narrow sides, but continuously on all four sides.

A component zone 5 in FIG. 1 contains electronic elements, including the power supply, which are necessary for performing the actual function of the electronic letter.

A component zone 5 is defined, as compared with the normal letter, in that it is not pliable, but rigid, and in that the thickness profile is predominantly greater than 2 mm and may locally reach 5 mm.

In distributing the masses over the component zones 5 and placing these in the electronic letter, it is necessary for the mass center of gravity to be identical to the area center of gravity. However, deviations of the mass center of gravity of 6% in relation to the respective half edge length of the letter format, in the case of a total mass of approximately 30 g, do not yet lead to the impairment of machine compatibility.

The component zone 5 should not overlap with parts of the stamp zone 1 or of the buffer and entry zone 4, so as to protect the electronic elements against the extreme mechanical loads in these regions.

The dimensions of the circumscribing rectangle of a component zone 5 having any desired shape are restricted by the selected letter format and by adherence to the properties of the stamp zone 1, buffer and entry zone 4 and bending and folding zone 6.

The edge length which is parallel to the main transport direction is also restricted by the rigidity or combined thickness and rigidity outtake which is customary in letter handling machines. In the case of the predominant thickness profile of 4 mm of the component zone, and with an edge length of up to 40 mm, machine compatibility is not impaired on account of increased separating out rates, as compared with normal letters.

On account of the dynamic behavior of the thickness and rigidity outtake carried out in known letter handling plants, thicknesses of approximately 4 mm and edge lengths of the component zones from 60 mm result, without doubt, in the impairment of machine compatibility and in increased outlay to achieve the necessary machine resistance, which, in turn, lead to a further reduction in machine compatibility, for example due to increased thickness or mass.

Machine resistance can be achieved, for example when rigid printed cards are used and the SMD (Surface Mounted Device) technology is employed in adhering to the above-mentioned dimension, in particular by sealing involving a low outlay, instead of by complete capping or housing.

If regions of the component zone 5 project beyond the size of the predominant thickness profile (for example, 4 mm), the edge length of these regions must be shortened correspondingly.

The edge length of the component zone 5, said edge length being parallel to the secondary transport direction, may be up to 25% longer than the edge running parallel to the main transport direction, without machine compatibility or machine resistance being impaired.

If button cells are arranged in a component zone for supplying power to the electronic letter and if these button cells have to be changed in the letter plane perpendicularly to the surface normal of the letter, the orifice of the battery holder must be placed parallel to the main transport direction. Thus, during acceleration and, in particular, during impactlike braking (for example, machine destacking into compartments or into stacking devices), mass inertia forces do not act in the direction of the battery slot and therefore do not act counter to the spring forces which fix the battery in the battery holder. Displacement of the battery in the direction of the battery slot and the resulting possible separation of the electric contacts are prevented.

Two adjacent component zones 5 in each case are separated by a bending and folding zone 6 in FIG. 1. Bending and folding zones 6 have the task of ensuring that the electronic letter has the flexibility necessary in mechanical letter handling. The electronic letter then appears "to the machine" like a normal letter, that is to say, for example in mechanical rigidity outtake, said letter is not taken out as being too rigid. These zones 6 ensure that the resultant forces and moments, which occur as a result of the deflection of the belts at deflecting rollers and act on the electronic letter, do not become too great, and that, in particular, increased lever effects, with bending moments resulting from these, do not act on the component zones. The connecting elements for the two component zones are also contained in said bending and folding zone. The pliability and reversed bending fatigue of the connecting elements must be greater than or equal to those of the padding material in the bending and folding zone.

The thickness of the bending and folding zone 6 is, at the boundary with the component zone 5, equal to that of this component zone and greater than or equal to that of the enclosed connecting elements.

Outside the main belt zone 3, thickness differences are compensated in a wedgelike or steplike manner. Within the main belt zone, the thickness profile must be kept predominantly constant.

With regard to the main transport direction, from an edge length of the bending and folding zone 6 which is greater than or equal to half the length of the largest adjoining component zone edge, there is sufficient machine compatibility.

The printer zone 7 in FIG. 1 is a special zone where the letter surface has reduced resilience, so that destination information can also be applied, without loss of information, by means of contacting stylus printing devices and is machine-readable. These printing devices are used in selected letter handling machines.

Printer zones 7 may be located on the entire surface of the letter. Their exact position and size depend on the standards of national Mail Administrations or private mail services. The required resilience of the surface is achieved by the selection of a suitable padding material and, if necessary, an additional firm foil in regions of buffer and entry zones and the bending and folding zone. If the buffer and entry zone is sufficiently large, it is also possible to use only the firm foil. In any event, the necessary flexibility of the buffer and entry zones or bending and folding zones should not be appreciably reduced. The printer zone 7 may also partially overlap component zones 5. However, in the region of the transitions from the component zone to printer zone, this results in an impairment of the print quality, that is to say of machine compatibility.

Electric connections between component zones are designed as helical springs which have the pliability, reversed bending fatigue and foldability which are necessary for machine compatibility, in particular at the transitions between component zone and folding and bending zone.

For electronic letters which are machine-compatible and machine-resistant and therefore have a long service life, these helical springs are covered, in the region of the bending and folding zone, with a sufficiently pliable and firm tube consisting, for example, of silicone.

A further possibility for the connection of rigid components is the use of rigid/flexible printed cards. If the rigid components are positioned along the main conveying direction, sufficient machine resistance of the connections of the electronic letter is achieved, particularly at the transitions from the rigid to the flexible regions of the printed card, when the connecting leads leave the rigid parts of the printed cards at the edges lying parallel to the main conveying direction, and, from there, preferably perpendicularly thereto.

Figure 2A:
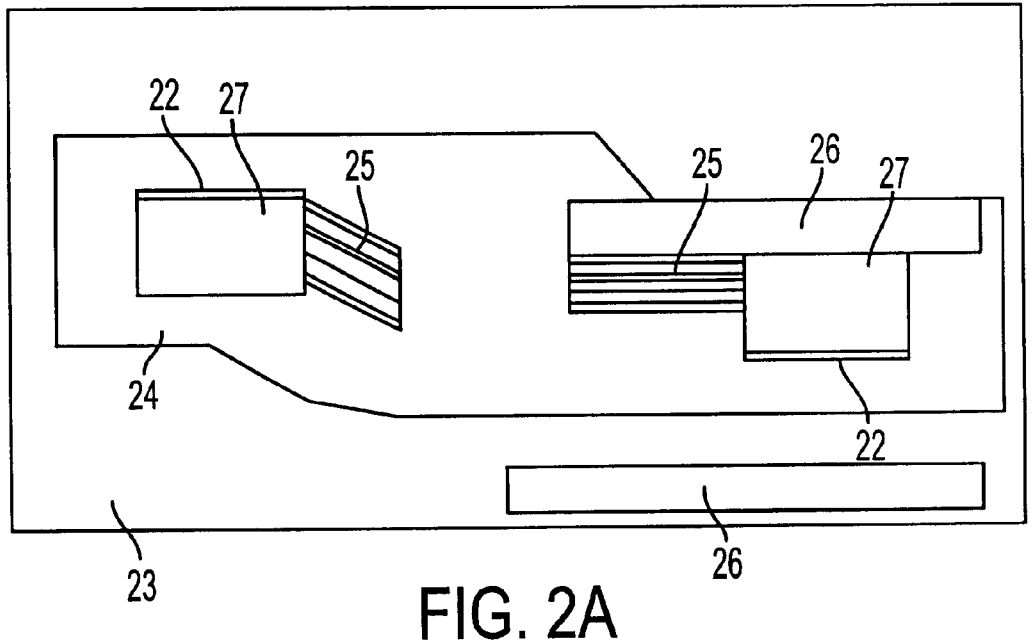
FIGS. 2a and 2b are schematic top plan and cross-sectional views, respectively of an apparatus according to the invention with three rigid components.
Figure 2B:
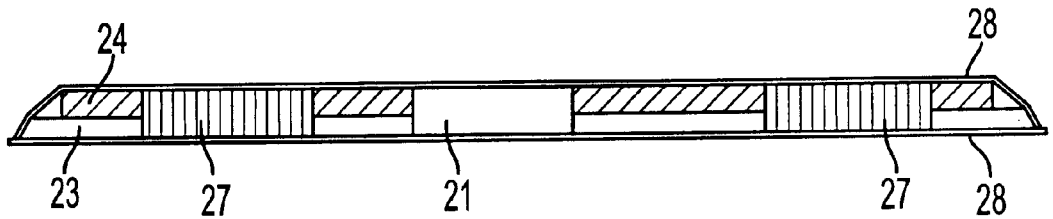

The exemplary embodiment 1 according to FIGS. 2a and 2b describes a solution of a machine-compatible and machine-resistant electronic letter for the standard format DL. This exemplary embodiment contains the following three component zones:

printed board 21 two battery compartments 22

An essential criterion for distributing the component zones in the arrangement is, in addition to the above-described general requirements of a zone division for machine-compatible and machine-resistant electronic letters, the production of two print zones 26 having predetermined positional orientations and dimensions. Since an overlap of the printer zones 26 with component zones is to be avoided, the eccentric position of the printed board 21 is defined by the predetermined arrangement of the upper printer zone. The identity of the mass center of gravity and area center of gravity within a sufficient tolerance band is achieved by the selected position of the other two component zones 22 of the battery compartments, and it must be remembered that the maximum height of the top edge of the right component zone is likewise defined by the position of the upper printer zone. By means of this arrangement, in the case of a dimensioning of the printed board of 35 mm×42 mm, a sufficiently large stamp zone, with an upper printer zone included, can be achieved.

Figure 3A:
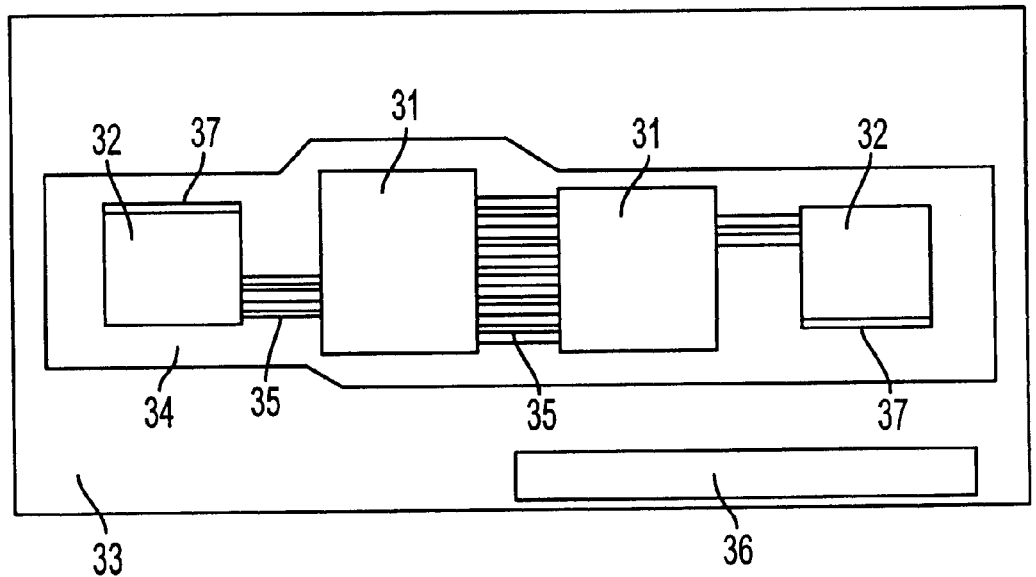
FIGS. 3a and 3b are schematic top plan and cross-section views, respectively of an apparatus according to the invention with four rigid components.
Figure 3B:
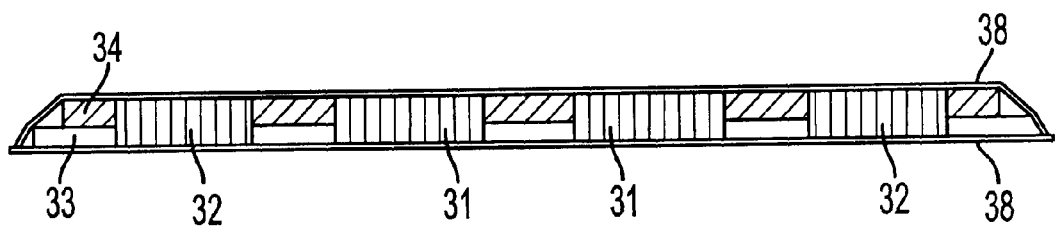

The description of the exemplary embodiment according to FIGS. 3a and 3b applies accordingly to the design of the buffer and entry zones.

The upper printer zone is formed by a firm foil in the region of the bending and folding zone between the central component zone 21 and the right component zone 22, said foil being applied additionally to the foam padding surrounding the component zones and said foil projecting into the right buffer and entry zones.

Since the lower buffer and entry zone is sufficiently large, the lower printer zone is formed by a firm foil without any foam padding. This solution ensures that the necessary flexibility of the buffer and entry zones and of the bending and folding zones is not appreciably reduced by the predetermined printer zones.

The electronic letter has a mass, including the two batteries, of approximately 30 g. The thickness profile in the main belt zone is constant at approximately 4.5 mm. The thickness profile of the electronic components is compensated by sealing with a semiflexible filler, on the one hand, and with a filler of low density, on the other hand. The bending and folding zones are formed, within the main belt zone, by a foam padding, the thickness of which corresponds approximately to that of the component zones. A functionally essential property of the selected foam is a low residual compression strain, that is to say up to 10% in the case of 20% deformation for 48 hours with 30 minutes expansion.

In the exemplary embodiment according to FIG. 3, an electronic letter is constructed for the standard format DL. A design criterion is that the electronic elements be distributed over four component zones having approximately the same area. The batteries to be used from a functional point of view predetermine the smallest area required for a rigid component. The battery holders 32 are designed in such a way that they only insignificantly increase the area requirement and the dimensions of their edge lengths are not critical with regard to the outtake behavior of known thickness and rigidity outtakes. The battery holders 32 are placed centrally symmetrically in the outer regions of the letter. Consequently, the number of connecting leads is minimized and the identity of the area center of gravity and mass center of gravity is ensured. The orifice for changing the batteries 37 is parallel to the main conveying direction and makes it possible to change the batteries in the letter plane. The remaining electronic elements are distributed over two further component zones in such a way as to produce as large a stamp zone as possible, cf. 1 in FIG. 1, the number of necessary connecting leads 35 is minimized and the mass center of gravity differs only noncritically from the area center of gravity. The width of these component zones 31, each of 35 mm, differs only insignificantly from that of the battery holders and consequently allows an equal distribution of the rigid components over the letter width, minus the two buffer and entry zones at the end faces. The resulting bending and folding zones 36 have a width of 17 mm. The width ratio to the component zone ($\leq 0.5$) is not critical with regard to the dynamic behavior of the thickness and rigidity outtake carried out in known letter handling plants.

The buffer and entry zones 33 at the end faces of the letter are of stepped design and, with the width of the adhesive fold of the covering foil of 4 mm (approximately 0.5 mm thick), a 2 mm thick padding material with a width of 6 mm and a 4 mm thick composite padding material with a width of 6 mm, reach the height of the battery holders of approximately 4 mm in the case of a total width of 16 mm. On account of the low-height of the rigid components, the buffer and entry zones can have a noncritical width.

The electronic letter has a mass, including the two batteries, of approximately 36 g. The thickness profile in the main belt zone is constant at approximately 4.5 mm. The thickness profile of the electronic components is compensated by sealing with a semiflexible filler, on the one hand, and with a filler of low density, on the other hand. The print zone 36 is formed at this point by modifying the buffer and entry zone. For this purpose, the padding material in the region of the print zone is replaced by a foil having sufficient flexibility and a firm surface.

What is claimed is:

1. An apparatus for monitoring the process of transporting flat consignments, said apparatus being designed as a flat consignment, with a sensor device, a memory device, an evaluation device and a power supply which are located in one or more component zones designed as rigid regions, in which apparatus there are between the component zones flexible bending and folding zones which have flexible padding material and flexible electric connection elements for the components and which are in a ain transport direction, in each case, at least half as long as the length of the largest adjoining component zone, there is a padded stamp zone having a compressive strength adapted to the stamping pressures, said stamp zone being capable of overlapping with outer zones, in addition to the component zones, there is a buffer and entry zone which consists of flexible padding material and which extends from the circumferential edges of the apparatus as far as the component zones and the bending and folding zones, with the thickness of the of the buffer and entry zone at the boundaries with the component zones and bending and folding zone being approximately equal to the thickness of these zones and decreasing toward the circumferential edges, the position of the component zones and the distribution of the masses over the component zones are such that the positions of the mass center of gravity and of the area center of gravity of the apparatus in relation to half the length and half the width of the apparatus differ from one another by no more than 6%.

2. The apparatus as claimed in claim 1, wherein the thickness decrease of the buffer and entry zone (4) is lower than or equal to 1:3 over the length.

3. The apparatus as claimed in claim 2, wherein rigid/flexible printed cards are provided as electric connections between the component zones.

4. The apparatus as claimed in claim 1, wherein there is a belt running zone which contains at least a rigid component zone and bending and folding zones, the region with the component zones and bending and folding zones having an approximately constant thickness profile.

5. The apparatus as claimed in claim 1, wherein a pliability and reversed bending fatigue of the flexible electric connecting elements is greater than or equal to the pliability and reversed bending fatigue of the padding material.

6. The apparatus as claimed in claim 1, wherein one or more printer zones of reduced resilience are provided, so that information can be applied to the surface of the apparatus by contacting printing devices.

7. The apparatus as claimed in claim 1, wherein helical springs are provided as electric connections between the component zones.

* * * * *

UNITED STATES PATENT AND TRADEMARK OFFICE
CERTIFICATE OF CORRECTION

| | |
|---|---|
| PATENT NO. | : 6,227,375 B1 |
| DATED | : May 8, 2001 |
| INVENTOR(S) | : Dieter Powollik et al. |

It is certified that error appears in the above-identified patent and that said Letters Patent is hereby corrected as shown below:

<u>Title page,</u>
Item [75] should read as follows:

Inventors:

Dieter POWOLLIK of Berlin (DE)
Frank VOSS of Berlin (DE)
Frank KARER of Woltersdorf (DE)

Signed and Sealed this

Twenty-fifth Day of December, 2001

Attest:

*Attesting Officer*

JAMES E. ROGAN
*Director of the United States Patent and Trademark Office*